United States Patent [19]

Hill et al.

[11] Patent Number: 5,216,774
[45] Date of Patent: Jun. 8, 1993

[54] WATER RECOVERY SYSTEM FOR TRUCK WASHER

[76] Inventors: James D. Hill, R.F.D. 3, Fairmont, Minn. 56031; James W. Shell, R.F.D. 1, Welcome, Minn. 56181

[21] Appl. No.: 920,975

[22] Filed: Jul. 28, 1992

[51] Int. Cl.⁵ .............................................. B60S 3/06
[52] U.S. Cl. ................................ 15/53.2; 15/DIG. 2; 134/123
[58] Field of Search ................ 15/50.3, 53.1–53.4, 15/97.3, DIG. 2; 134/123, 45

[56] References Cited

U.S. PATENT DOCUMENTS

| 2,636,198 | 4/1953 | Wilson | 15/53.2 |
| 2,876,472 | 3/1959 | Rousseau | 15/53.2 |
| 2,950,492 | 8/1960 | Liekweg | 15/53.2 |

FOREIGN PATENT DOCUMENTS

| 3403415 | 10/1984 | Fed. Rep. of Germany | 15/DIG. 2 |
| 0556785 | 5/1977 | U.S.S.R. | 15/53.2 |

Primary Examiner—Edward L. Roberts

[57] ABSTRACT

An improvement for washing devices for truck trailers or similar devices. The washing device consists of a rotating brush mounted on a driven vehicle chassis and having a delivery system to deliver a cleaning fluid—usually water or soapy water—to the brush. The current improvement is the addition of a catch basin below the brush adapted to catch water from the side of the truck being washed. A disposal system for the fluid caught in the catch basin may also be provided.

10 Claims, 2 Drawing Sheets

WATER RECOVERY SYSTEM FOR TRUCK WASHER

BACKGROUND AND SUMMARY OF THE INVENTION

This invention pertains to portable devices for the washing of trucks, trailers and the like such as shown in our previous U.S. Pat. No. 5,133,100 and to an improvement which provides a less ecologically damaging device.

In our previous patent we describe a fully portable washing device adapted to wash the side of a truck, semitrailer or the like by use of a water spray and a rotating brush. Such devices wash adequately as cleaning devices, but the water used simply drops to the ground. On a concrete slab such discharge may be acceptable if adequate drainage is provided by surface drains or the like. Even then, the water is not economically used. On gravel or dirt surfaces, the water can create mud holes, puddles and wet spots which make successive washings difficult or inadvisable.

By this new invention, we provide a catch basin means on the portable rig which will catch a substantial portion of the water and recycle the water so that it is not discharged onto the ground. Thus with the new device water is saved and the surface on which the washer and the object being washed stand is kept from becoming a quagmire so that a plurality of washings may be done successively in the same place and protect the environment from contamination.

DESCRIPTION

Figure 1:
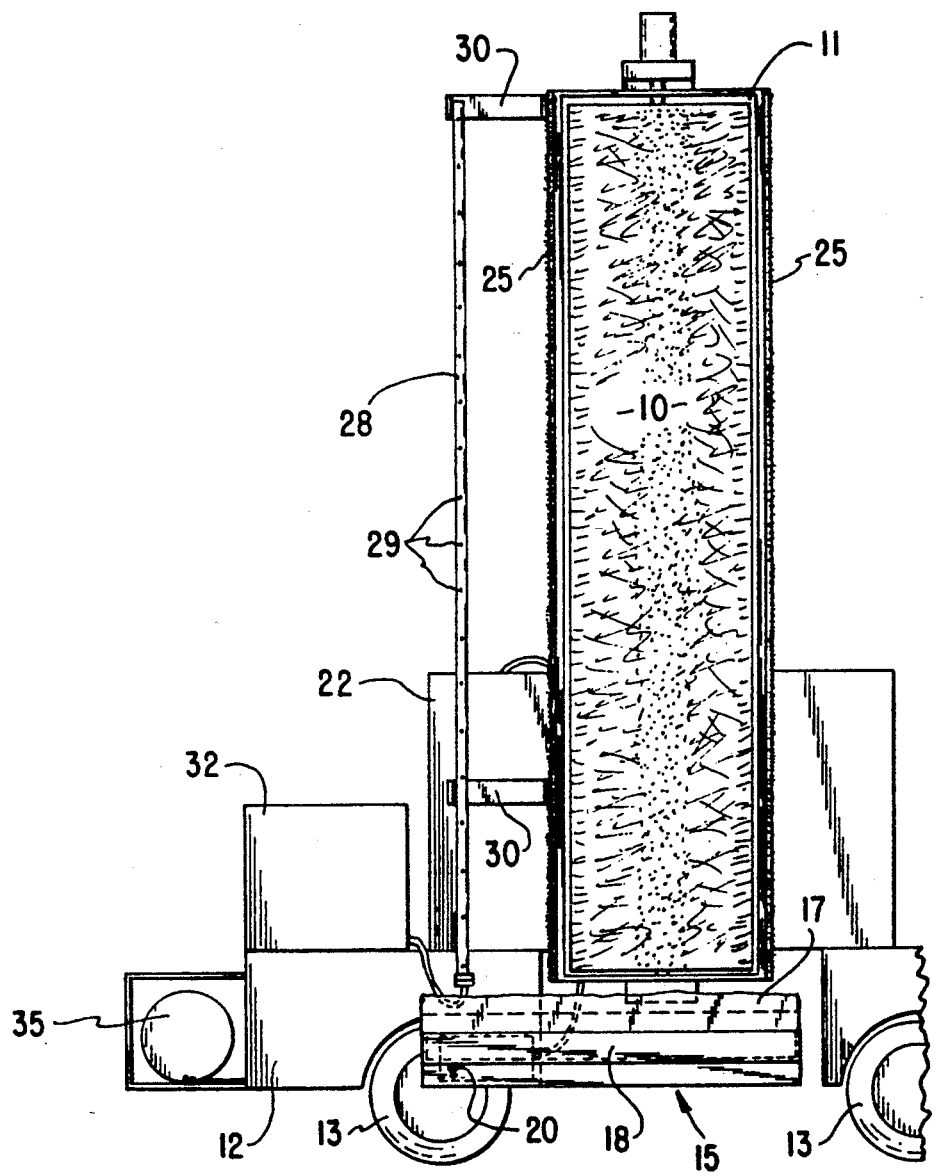
FIG. 1 is a side elevational view of the washer embodying our invention.
Figure 3:
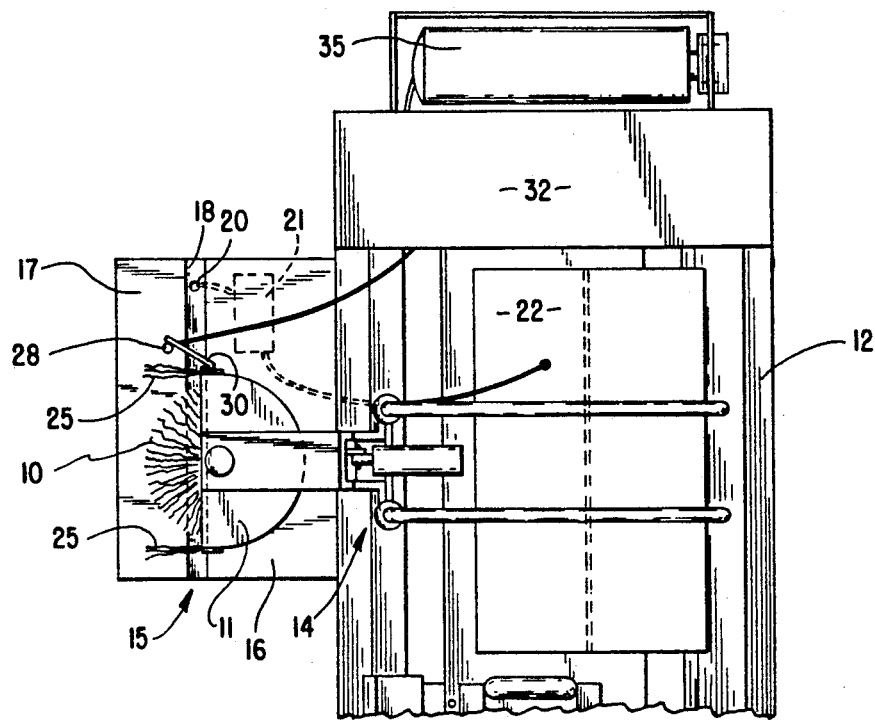
FIG. 3 is a partial top plan view of the washer of FIGS. 1 and 2.
Figure 2:
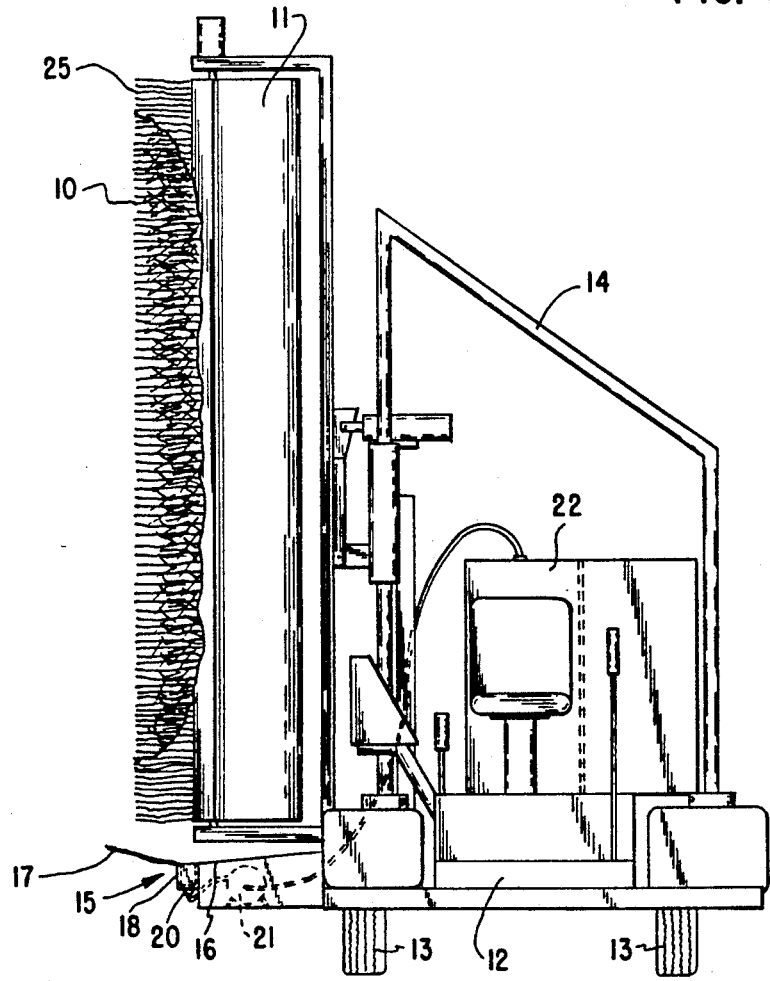
FIG. 2 is a front elevational view of the washer of FIG. 1.

Briefly this invention comprises an improvement to the device described in our previous patent referred to above. The improvement comprises the provision of a means of recovering the used water and recirculating it for reuse.

More specifically and referring to the drawings, our previous patent described a device for washing a truck or the like which included a rotating brush 10 partially surrounded by a shield 11 and carried by a self-propelled cart having a chassis 12 mounted on wheels 13. The brush 10 and shield 11 are mounted on a frame 14 carried by the cart. Means is provided for supplying water to the brush 10 either for washing in which case a detergent may be added to the water or for rinsing.

The previous device worked well, but has been criticized as wasteful of water, for creating objectionable wet spots around the object being washed and for creating a possibly unsafe environment. Therefore, the current invention provides a means of catching the water which may then be recycled or discharged in an appropriate location.

In use, the brush 10 rotates on a vertical axis and extends beyond the side of the chassis 12. Water is supplied to the brush and is generously thrown onto the side of the washed object.

By this invention a V-shaped trough 15 is carried by the chassis immediately below the brush 10. One leg 16 of the V-shape is fixed to the chassis and is made of relatively rigid material. The outer leg 17 is made of a soft rubberized material, rigid enough to carry its own weight and a modest amount of water, but soft enough to slide along the side of the truck or trailer without doing damage to the surface.

Between the two legs of the V shape, the trough includes a catch basin 18 in the shape of an elongated channel. This basin is supported by the leg 16 and supports the soft outer leg 17 and is adapted to catch water drained from either leg. The bottom of the channel may be sloped slightly so as to direct water to an outlet 20. A pump 21 may be used to pump the water from the outlet 20 into a holding tank 22 on the chassis. This tank may be either compartmental to be used as a treatment tank, may simply be used as a holding tank to be pumped out at the end of the day or may be a settling tank if the water is to be reused without treatment.

In order to increase the efficiency of the recovery of the water, it is desirable to keep the centrifugal force on the rotating brush 10 from throwing the water beyond the limits of the trough 15. Thus, a shield on both sides of the brush is desirable. In our preferred embodiment, these shields are formed of fixed brushes 25 attached to the shield 11 on both sides of the brush 10. The fixed brushes are formed of a series of plastic bristles stiff enough to stand out from the shield, but soft enough to brush the side of the trailer being washed without damaging the paint or metal sheets on the side of the trailer. Thus, the brushes 25 effectively enclose the rotating brush and its liquid in a compartment drained by the trough 15.

A further refinement to provide added drying for the washed surface may be provided. Following the rear brush 25 in the normal direction of motion, we provide a manifold 28 (FIG. 1). This manifold is formed with a series of holes 29. The manifold is carried on a bracket 30 fastened to the shield 11 or to the mounting device for that shield. The manifold may be used in either of two alternative ways. In some instances it may be desired simply to blow the adjacent surface dry. In such a case, compressed air may be supplied to the manifold from a compressor enclosed in a utility compartment 32. The air will be forced from the holes 29 and directed against the adjacent surface to blow the water from the surface.

Alternatively, it might be desirable to suck the water from the surface. In this case a vacuum pump would be located in the compartment 32 and the air and water would be sucked from the adjacent surface through a depository tank to drop out the water in a manner similar to that of wet/dry vacuum cleaners used in many shops and homes. Either alternative is effective, and the preferred method depends on the desires of the user.

An additional option is also envisioned. If heated water is desired to be used, it can be provided by mounting a water heater such as a tank type device 35, or a simple flash heater in the water line between the supply tank and the brush. Many types of heaters are well known in this art and in connection with recreational vehicles and therefore are not described here in detail.

It is thus apparent that use of the improved washer will result in considerable saving of water over the device described in the previous patent, and that the work area of the washing process will also be left in much more satisfactory condition. NAME: James D.

Hill and James W. Shell TITLE: Water Recovery System for Truck Washer

I claim as my invention:

1. In combination with a mobile washing device adapted to move past and wash an adjacent surface and having a chassis mounted on wheels and rotating brush normally having a vertical axis, the improvement which comprises a catch basin mounted on said chassis beneath said brush, said catch basin having a flexible portion extending from said chassis toward the surface to be washed.

2. The combination of claim 1 in which said catch basin is generally V-shaped, one leg of said V-shape being rigid and attached to said chassis, the other leg of said V-shape being said flexible portion of said catch basin.

3. The combination of claim 2 in which said legs of said catch basin are separated by channel means, said legs both being fixed to said channel means, said channel means including a drain from which liquid falling onto said legs and into said channel means may be discharged.

4. The combination of claim 3 in which said channel means is sloped downwardly to said drain, tank means on said chassis and pump means connected between said drain and said tank means whereby said liquid is pumped from said drain to said tank means.

5. The combination of claim 1 in which tank means is mounted on said chassis, washing liquid stored in said tank means adapted to be pumped to said rotating brush, liquid heating means between said tank and said brush adapted to heat said liquid before said liquid is discharged onto said brush.

6. The combination of claim 1 in which said rotating brush is partly surrounded by a shield, said shield being of partial cylindrical shape having edges adjacent said rotating brush, stationary brush means fixed to said edges and adapted to extend outwardly toward said adjacent surface whereby said shield and said stationary brush means combine with said adjacent surface to form a substantial enclosure within which said rotary brush can brush said adjacent surface.

7. The combination of claim 6 in which chassis is adapted to move forward past said adjacent surface, said stationary brush means being fixed to both the forward edge and the rearward edge of said shield, air transmittal means mounted on said shield behind said rearward edge said air transmittal means extending the length of said shield and having openings spaced along its length, air pump means adapted to move air through said openings whereby air is moved over said adjacent surface to dry said surface after said rotary brush and said stationary brushes have passed over said surface.

8. The combination of claim 7 in which said air pump means includes a compressor adapted to blow air onto said adjacent surface to cause said surface to be blown dry.

9. The combination of claim 7 in which said air pump means draws air through said openings, said air normally including entrained droplets of liquid whereby said liquid is drawn from said adjacent surface.

10. The combination of claim 6 in which said chassis is adapted to move forward past said adjacent surface, said catch basin extending both forward of and behind said stationary brushes.

* * * * *